April 22, 1952  F. B. JONES  2,593,461
ARTIFICIAL CASTING LURE
Filed Sept. 15, 1947  2 SHEETS—SHEET 2
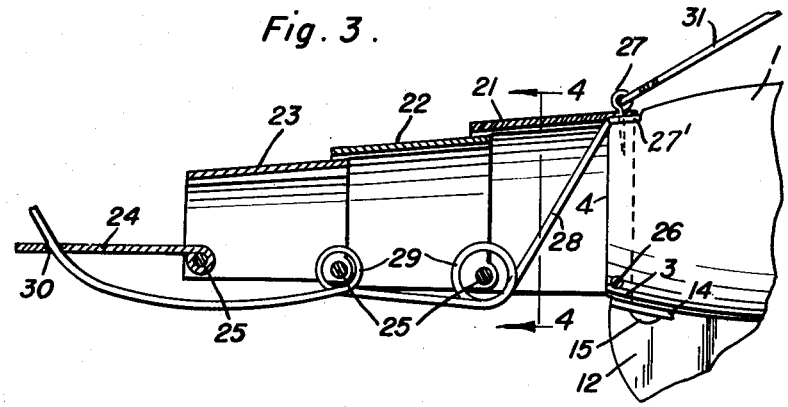
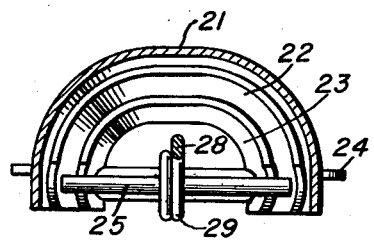
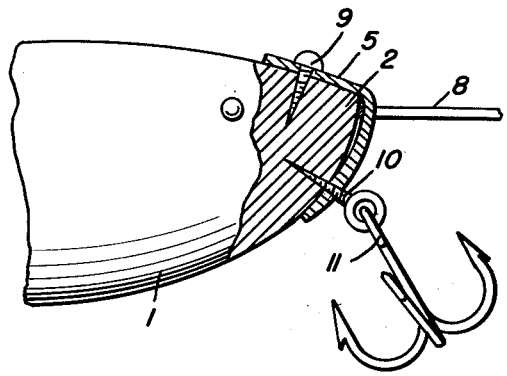
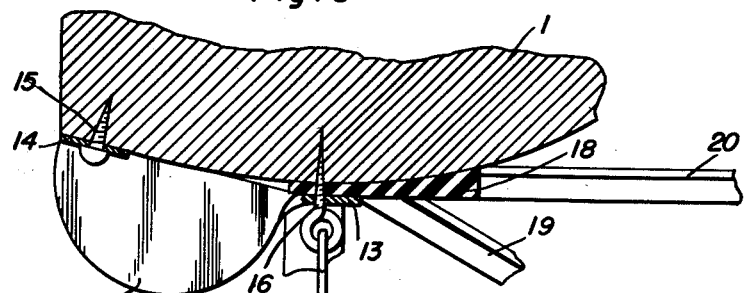
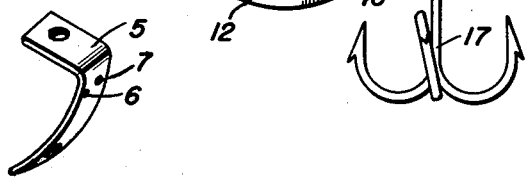
INVENTOR.
Frank B. Jones

UNITED STATES PATENT OFFICE 2,593,461

ARTIFICIAL CASTING LURE

Frank B. Jones, Pineville, La.

Application September 15, 1947, Serial No. 773,973

1 Claim. (Cl. 43—42.15)

This invention relates to improvement in artificial casting lures.

An object of the invention is to provide an improved form of artificial casting lure simulating a crayfish.

Another object of the invention is to provide an improved artificial casting lure simulating a crayfish, the same being formed with a solid body and a plurality of inter-connected hinged tail sections secured to the rear of the body, flexible legs and whiskers supported upon said body.

A further object of the invention is to provide an improved artificial casting lure made to simulate a crayfish, said lure including a solid body upon which flexible lively rubber legs and whiskers of nylon leaders are supported, with a balancing rudder attached to the lower rear end of the body, gang hooks being attached to the body, and a tail comprising multiple interconnected sections also being attached to the rear end of the body and having a spring associated therewith for resiliently holding the tail in extended position while permitting angular movement between its sections.

A still further object of the invention is to provide an improved artificial casting lure simulating a crayfish, said lure being highly efficient in use, and relatively inexpensive to manufacture and produce.

Other objects will appear as the description proceeds.

In the accompanying drawings which form a part of this application,

Figure 1 is a side elevation of the improved artificial casting lure;

Figure 2 is a top plan view of the improved artificial casting lure;

Figure 3 is an enlarged vertical longitudinal sectional view through the interconnected sectional tail portion of the lure showing the holding spring therefor;

Figure 4 is a sectional view taken on the line 4—4 of Figure 3;

Figure 5 is an enlarged detail side elevation of the front or head end of the lure, the same being partly broken away and in section to better show the construction thereof;

Figure 6 is an enlarged detail view, partly in section showing the balancing rudder supported upon the lower rear end of the lure body with a screw eye supporting a gang hook and securing the rudder and the rubber legs upon said lure body;

Figure 7 is a perspective view of the clamp attachable to the nose of the lure for supporting the whiskers and a gang hook, and Figure 8 is an enlarged perspective view of the balancing rudder.

Like characters of reference are used throughout the following specification and the accompanying drawings to designate corresponding parts.

In carrying out the invention, there is provided an improved artificial casting lure simulating a crayfish including a body 1 having a nose portion 2 and a rear end terminating in a reduced collar portion 3 and cut off square on its end as at 4.

An angular L-shape metal clamp or nose plate 5 is superimposed over the nose portion 2 of the body 1 and is formed with a pair of transversely extending spaced openings 6 and 7 through which nylon leaders or whiskers 8 are disposed to extend forwardly of said body 1. A screw 9 extends through the upper leg of the nose plate 5 into the lure body 1, while a screw eye 10 extends through the lower leg of the plate 5 into the lure body 1 and supports a gang hook 11 in its eye portion.

A balancing rudder 12 of semi-circular shape is formed with apertured ears 13 and 14 on its front and rear ends respectively, and is adapted to be secured centrally to the bottom rear end of the lure body 1, to depend below the same. A screw 15 extends through the rear apertured ear 14 into the body 1, and a screw eye 16 to which a gang hook 17 is attached, will be disposed through the front apertured ear 13 and through the lively rubber member 18 which is shaped to provide the radially extending legs 19 and the forwardly extending simulated claws 20, and is anchored in the body 1.

The tail portion of the lure is formed of several interconnected tail sections 21, 22 and 23, and a transversely extending tail pad 24.

Each tail section is of inverted U-shape in cross-section and is hinged to the preceding tail section by means of the headed hinge pins 25, and is progressively smaller than the section in front of it. The front tail section 21 is made fast to the reduced collar portion 3 of the body 1 by means of the cross pin 26, and a screw eye 27 extends through the upper portion thereof and through the flattened forward end portion 27' of a wire spring arm 28, the latter being looped at 29 to extend about the hinge pins 25, and through the aperture 30 in the transversely extending tail pad 24, thereby serving to normally and resiliently hold the tail sections in

Patented Apr. 22, 1952

2,593,462

UNITED STATES PATENT OFFICE 2,593,462

METHOD OF TREATING EGG WHITES

Arthur M. Kaplan, Hyattsville, Md., and Mathilde Solowey, Washington, D. C., assignors to the United States of America as represented by the Secretary of Agriculture No Drawing. Application November 8, 1949, Serial No. 126,261

5 Claims. (Cl. 99—210)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the manufacture of dried egg whites, and more particularly to the method of thinning liquid egg white by non-proliferating cell fermentation.

In the production of commercial dried egg whites, that is dried egg albumen, it is common practice to thin liquid egg white by fermentation with microorganisms either naturally present therein or introduced by inoculation with suitable microbiological cultures. The activity of these microorganisms in the course of the fermentation process causes elimination of the sugar present in the egg white and results in a separation of the insoluble constituents from the liquid albumen fraction, which can then be readily segregated for subsequent processing and drying.

The yield as well as the quality of dried egg albumen derived from egg whites thinned by natural fermentation vary greatly, and the products so obtained frequently possess an objectionable odor and flavor. Egg whites subjected to controlled fermentation also tend to yield dried egg albumen of varying quality due to contamination of the mother cultures used as inocula, or to the failure to suppress in the course of the fermentation the detrimental action of deleterious microorganisms accidentally present in the egg white, since generally in the fermentation of egg whites by previously proposed procedures the number of microorganisms initially present therein, as well as of those added by inoculation, increases as the sugar is utilized and fermentation proceeds to completion. It has also been found that under certain conditions addition of starter cultures induces a stimulated growth of microorganisms accidentally present in the egg white which frequently causes the development of objectionable odors and flavors.

By increasing the size of the inoculum, when using any suitable microorganisms capable of producing acid from sugar, it is possible to decrease the length of time necessary to bring the fermentation process to completion from the usual 48–72 hours to a period of about 21–24 hours. However, under these conditions also, the detrimental activity of microorganisms initially present in the egg white is not always impeded. Furthermore the preparation of starter or mother cultures is a laborious, time consuming and exacting task, and since it is impracticable to prepare pure mother cultures of liquid egg white on a large scale under commercial conditions, the use of large inocula results in adulteration of the fermented egg whites with the other media used to culture the microorganisms that bring about the fermentation.

We have found that the disadvantages inherent in the methods heretofore proposed are obviated and complete fermentation of egg whites is rapidly attained on effecting the process by means of microorganisms capable of producing acid from sugar, added as an inoculum in a non-proliferating stage.

According to the method of our invention a concentrated microbial preparation of microorganisms capable of producing acid from sugar, such as Lactobacilli, Streptococci and Aerobacter is prepared by growing the organisms in a suitable liquid medium under optimum growing conditions and then recovering the microbial cells from the culture by any suitable procedure such as filtration or centrifugation. The resulting concentrated microbial preparations, as harvested, or in the form of suitable pastes, slurries or suspensions, are used as inocula for direct seeding of the egg whites to be fermented with the desired concentration of the organisms, allowing the fermentation to proceed to completion under optimum conditions of pH, aeration and temperature, as required by the specific microorganisms employed.

We have found that on following this procedure complete fermentation is attained within a very short period with no proliferation of the organisms introduced as an inoculum or of any organisms accidentally present in the egg white. Upon completion of the fermentation as determined by the usual chemical tests, the insolubles are removed by gravity, skimming, centrifugal force, filtration under pressure or any other appropriate procedure and the fermented egg whites dried in a conventional manner. Our fermentation method causes no breakdown of the egg white protein by proteolysis, and since any microorganisms that may be accidentally present in the egg white do not multiply in the course of the fermentation process, the fermented liquid egg whites and the dried albumen obtained therefrom are free from objectionable off-flavor and odor. The final products thus obtained undergo no browning on subsequent storage at ordinary and elevated temperatures, while their appearance and properties are characteristic of the finest grade of edible dried egg albumen.

In the production of concentrated microbial preparations used as inocula in our process the harvested cells can be utilized in the form of pastes, slurries or suspensions by combining them with liquid egg white, water, or any other non-toxic liquid which will not adulterate the egg whites or be harmful to the microorganisms. Such preparations can be stored until needed since we have found that they can be maintained at refrigerator temperatures for long periods with no significant decrease in viability. Thus our method obviates the necessity of constantly preparing mother cultures of fermenting egg white, and the hazards of contamination incidental thereto; it also precludes adulteration of egg whites with extraneous materials such as are present in culture media, or fermenting grains or vegetable masses used as inocula. Furthermore, the concentrated microbial preparations utilized as inocula in our process make it possible to seed the egg whites with concentrations of microorganisms that cannot be attained by using ordinary starter or mother cultures.

The following example is given as an illustrative embodiment of a manner in which our invention may be carried out in practice.

EXAMPLE I

Concentrates of *Streptococcus liquefaciens* were prepared from 24 hours tryptose broth cultures by the filtration technique of Kaplan and Elberg (1946, J. Bact. 52, 513–517) and by centrifugation at 1800 R. P. M. for 1 hour. The former technique yielded pastes containing on the order of $1.3 \times 10^{12}$ organisms per gram; the latter yielded concentrates on the order of $2.5 \times 10^{11}$ organisms per milliliter of packed cells. Original counts of the broth cultures were on the order of $2.3 \times 10^8$ per milliliter. The concentrated cell preparations were thinned out 1 to 1 with liquid egg white and the resulting suspensions were used as inocula. Egg white acidified to pH 6.8–7.2 with dilute hydrochloric acid and warmed to 37° C., was admixed with a sufficient amount of inoculum to give a final count of microorganisms added on the order of $1.0 \times 10^9$ per milliliter of egg white, and fermentation was then allowed to proceed at 37° C. The fermentation process was substantially completed within 3–4 hours, as indicated by a decrease of the glucose content to .005 percent by weight. The rate of fermentation was followed by the disappearance of reducing sugars, expressed as glucose, determined by the colorimetric method of Somogyi (1945, J. Biol. Chem. 160, 61–68), using a Klett-Summerson photoelectric colorimeter with a #54 filter. As the glucose was utilized by the organisms a drop in pH occurred with final pH values of about 5.2–5.7, determined by means of a Beckman pH meter with the glass electrode.

The experimental data shown in Table 1 indicate that concentrated suspensions of the microorganisms did not exhibit a significant decrease in viability when stored at refrigerator temperatures for a long period. The experimental data shown in Table 2 indicate that substantially no proliferation of microorganisms and no appreciable degradation of egg white by proteolysis occurred during the fermentation process.

Table 1

STABILITY OF CONCENTRATED PREPARATIONS OF *STREPTOCOCCUS LIQUEFACIENS* WHEN DILUTED 1-10 IN SALINE AND STORED AT 2° C.

| Storage Period (days) | Bacterial Count | |
|---|---|---|
| | Centrifuged (per milliliter packed cells) | Filtered (per gram) |
| 0 | $2.5 \times 10^{11}$ | $1.3 \times 10^{12}$ |
| 1 | $2.5 \times 10^{11}$ | |
| 2 | $2.7 \times 10^{11}$ | |
| 3 | | $4.5 \times 10^{11}$ |
| 6 | $2.6 \times 10^{11}$ | |
| 8 | $1.4 \times 10^{11}$ | |
| 10 | $1.3 \times 10^{11}$ | $5.4 \times 10^{11}$ |
| 13 | $1.2 \times 10^{11}$ | |
| 16 | $1.0 \times 10^{11}$ | |

Table 2

THE FERMENTATION OF EGG WHITE BY A CONCENTRATED INOCULUM OF *STREPTOCOCCUS LIQUEFACIENS*.

| Incubation Time (Hours) | Bacterial Count (per ml.) | Glucose (percent) | pH | Formol Nitrogen (mg. percent) |
|---|---|---|---|---|
| 0 | $4.7 \times 10^9$ | .302 | 6.45 | 126 |
| 1 | $4.6 \times 10^9$ | .147 | 5.70 | |
| 1.5 | $4.5 \times 10^9$ | .104 | 5.35 | |
| 2 | $2.6 \times 10^9$ | .066 | 5.22 | |
| 3 | $2.5 \times 10^9$ | .012 | 5.10 | |
| 4 | $1.6 \times 10^9$ | .005 | 5.02 | |
| 5 | $1.8 \times 10^9$ | .005 | 5.00 | 101 |

Temperature of incubation = 30° C. for 1st hour, 37° C. after Inoculum = 1.4 percent wet weight.

Viable bacterial counts were made using tryptose phosphate agar with incubation at 37° C. for 24 hours. Formol nitrogen was determined as described by Melnick and Oser (1949, Food Techn. 3, 57–71). Upon completion of the fermentation the insolubles were removed by gravity and the fermented liquid egg whites so obtained were dried in the conventional manner.

The dried egg whites produced by the above described procedure are free from off-flavor and odor, do not undergo browning on storage at ordinary and elevated temperatures, reconstitute well and exhibit excellent foaming characteristics. The concentrates produced by filtration or centrifugation can also be used as inocula without previous dilution, or they can be diluted with water 0.85% saline, or buffer solutions in lieu of liquid egg white.

The following example is given as an illustrative embodiment of a manner in which our invention inhibits the proliferation of microorganisms present in egg white which tend to produce off odors and flavors in fermenting egg white.

EXAMPLE II

The bacterial cells from 1 liter of a 24 hour broth culture were harvested by centrifugation and taken up in 100 milliliters of egg white which had been seeded with 0.5 milliliter each of a 24 hour broth culture of *Aerobacter cloacae*, *Proteus vulgaris*, *Serratia marcescens* and *Pseudomonas* sp., some of the common contaminants of egg products. Total viable count, sugar, and pH determinations were made as described under Example I. Viable gram negative